United States Patent [19]
Copeland

[11] Patent Number: 4,805,015
[45] Date of Patent: Feb. 14, 1989

[54] AIRBORNE STEREOSCOPIC IMAGING SYSTEM

[76] Inventor: J. William Copeland, 3835 Carlson Cir., Palo Alto, Calif. 94306

[21] Appl. No.: 903,615

[22] Filed: Sep. 4, 1986

[51] Int. Cl.$^4$ ............... H04N 13/00; H04N 17/18
[52] U.S. Cl. ............................. 358/88; 358/103; 358/109
[58] Field of Search ............ 358/103, 109, 88, 89, 358/91, 92, 3, 229; 354/112; 350/130, 131; 364/521, 522; 73/178, 178 T; 244/3.16, 3.17; 382/1; 356/1, 2, 3, 4, 9, 12

[56] References Cited

U.S. PATENT DOCUMENTS

| | | | |
|---|---|---|---|
| 1,876,272 | 9/1932 | Bayer | 358/88 |
| 2,408,115 | 9/1946 | Varian | 358/92 X |
| 2,417,446 | 3/1947 | Reynolds | 358/92 |
| 2,949,055 | 8/1960 | Blackstone | 358/109 X |
| 3,053,932 | 9/1962 | Worst | 358/109 |
| 3,147,335 | 9/1964 | Guerth | 358/103 X |
| 3,261,014 | 7/1966 | Diaz | 358/103 X |
| 3,614,314 | 10/1971 | Rossire | 358/88 X |
| 3,721,499 | 3/1973 | Narbaits-Jaureguy | 358/103 X |
| 3,961,851 | 6/1976 | Gerharz | 358/91 X |
| 4,234,241 | 11/1980 | Schmidt | 358/109 X |
| 4,298,176 | 11/1981 | Kendall | 358/88 X |
| 4,310,849 | 1/1982 | Glass | 358/88 |
| 4,601,053 | 7/1986 | Grumet | 358/88 X |
| 4,613,899 | 9/1986 | Kuwano et al. | 358/109 X |
| 4,641,960 | 2/1987 | Bozzolato | 356/12 X |

OTHER PUBLICATIONS

"Radio Controlled Television Plane", *Television News*, Mar. '31; Gernsback.
J. Greer, "Helmet of Dreams", San Jose Mercury News, Jan. 12, 1986, p. 3A.
S. Fisher, "Virtual Interface Environment", NASA Ames Research Center, presented at the Space Station Human Factors Research Review, Dec. 3-6, 1985, pp. 1-2.

*Primary Examiner*—Howard W. Britton
*Assistant Examiner*—Victor R. Kostak
*Attorney, Agent, or Firm*—Thomas G. MacDonald; Alan H. MacPherson; Paul J. Winters

[57] ABSTRACT

The imaging system includes widely-spaced sensors on an airborne vehicle providing a base-line distance of from about five to about 65 meters between the sensors. The sensors view an object in adjacent air space at distances of from about 0.3 to 20 kilometers. The sensors may be video cameras or radar, sonar infrared or laser transponders. Two separate images of the object are viewed by the spaced sensors and signals representing each image are transmitted to a stereo display so that a pilot/observer in the aircraft has increased depth perception of the object. In effect the interpupillary distance of the human viewer is increased from the normal 5.9-7.5 cm to from about 5 to about 65 meters resulting in depth perception of objects at a distance of from about 0.3 km to 20 km or more.

4 Claims, 3 Drawing Sheets

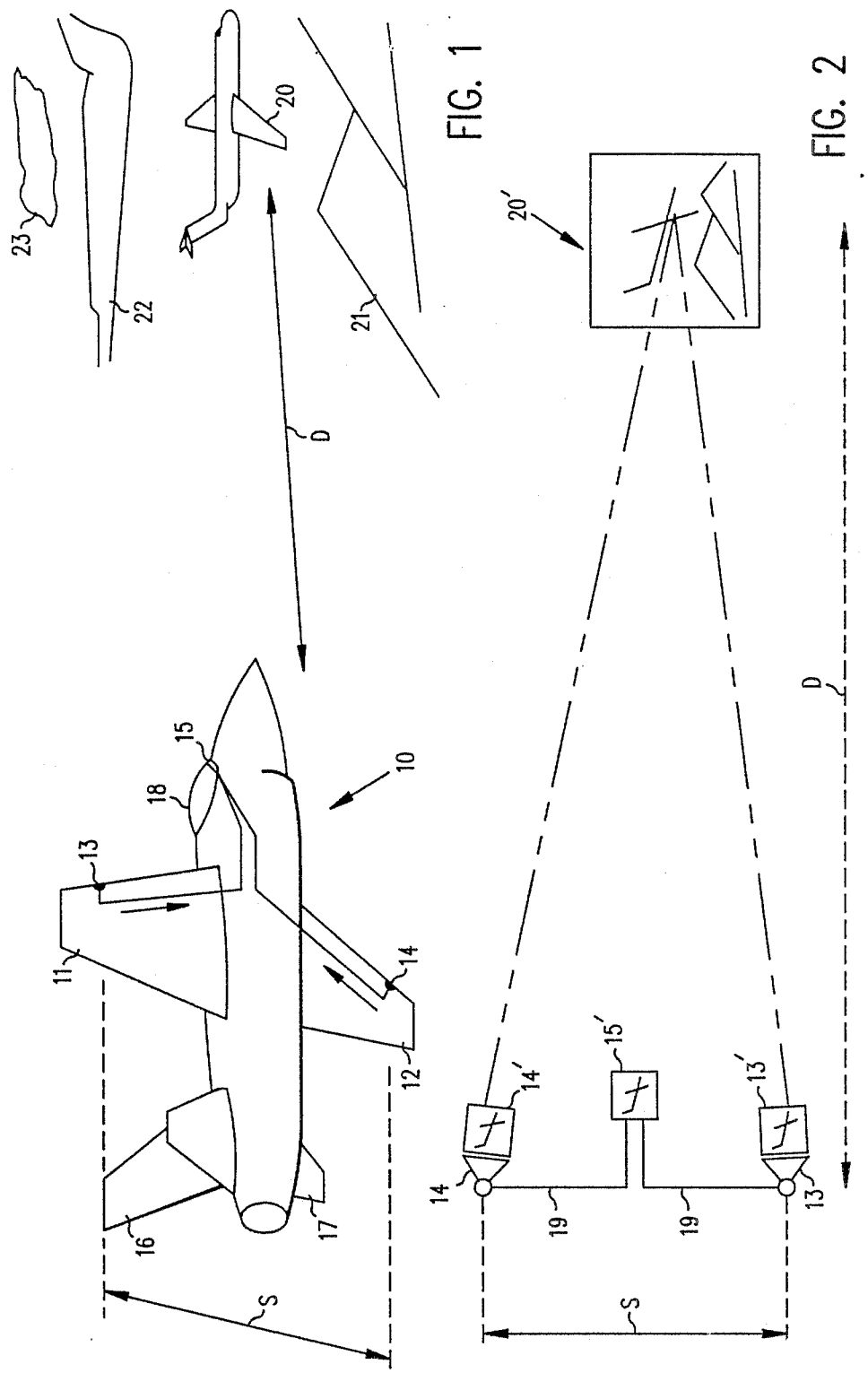

AIRBORNE STEREOSCOPIC IMAGING SYSTEM

FIELD OF THE INVENTION

This invention relates to an airborne stereoscopic viewing and imaging system. More particular, the invention is directed to a system for enhancing the depth perception of a pilot or observer in an aircraft as to more easily distinguish and visually see objects at finite distances from the viewer.

BACKGROUND

A pilot or observer in an aircraft, shuttle vehicle or other airborne vehicle normally files by visual observation, radio control, radar control or computer control. Avoidance and identification of other objects at a finite distance in airspace or space is also done visually or by illumination of the object by radar, by a laser, by a high-intensity light or by sound waves and subsequent sensing and observation by the human eye of a returned and processed visual signal. This signal may be one from direct observation of the object by the eyes or from a display to the eyes from a television camera, infrared detector, radar or sonar screen or by a remote, shared communication link. The human eyes have a good degree of stereo depth perception ideally covering objects at distances of less than 10 meters. Less ideally, objects at up to about 100 meters distance can also be seen to have some depth but the ability to "see" depth in an object increasingly fades beyond the 100 meter distance.

This phenomenon is particularly acute when the airborne vehicle is flying at high speeds when the finite time to pick-up and observe an object is very small. The time left to avoid an object or lock-in on the object, in the case of a military aircraft desirous of firing at the object, is also increasingly small as closing speeds increase.

When the objects are perceived without depth perception, it becomes harder to pick up the object against its background, be it space, clouds, mountains, or other terrain and to visually determine its approximate distance from the observer. Additionally, no shadows can be seen on the object. Thus, while shadow, haze and the convergent lines of perspective at infinity give some clues as to distances when objects are over 100 meters distance from the human observer, human imaging skills lessen greatly and the ability of the pilot to properly guide the craft is lessened. The primary reason for loss of depth perception is the relatively small baseline between the human eyes, which does not permit a human to have much depth perception of objects at a distance greater than about 100 meters.

Aircraft warning systems have been proposed such as seen in U.S. Pat. No. 3,053,932 in which cameras mounted above and below an aircraft fuselage continuously scan in hemispherical areas about and below the aircraft with radar, infrared or ultraviolet radiation to detect an object and present separate pictures in the form of a visual display of surrounding air space to the pilot. If a clearer view is desired, the pilot can switch to a telephoto lens or a camera can be locked on to the object.

As seen in U.S. Pat. No. 3,518,929, multiple cameras have been employed to simultaneously photograph a scene where all the cameras have a common film transport mechanism and have optical axes convergent on the scene. According to that patent the convergent axes may be altered to permit convergence at a distance other than 26 feet.

U.S. Pat. No. 3,608,458 illustrates a fish eye type camera for taking wide angle stereoscopic pictures where the lenses have a predetermined operative angle with respect to each other. U.S. Pat. No. 3,697,675 shows a stereoscopic television system in which a pair of monochrome TV cameras view the same scene from two separated and variable positions and, with appropriate circuitry, supply color signal separate images of different color which are produced on a color TV receiver. When viewed through special glasses, a three dimensional scene is perceived.

Airborne stereoscopic scanners of terrain below an aircraft are seen in U.S. Pat. No. 2,949,005 in which an image from a first position of the scanner is displayed and then one from a second position of the scanner to give a stereo effect. Scanning is in the direction of the flight axis. U.S. Pat. No. 3,670,097 discloses prior art stereoscopic television systems in which two separate cameras and two separate receivers transmit right and left optical images. U.S. Pat. No. 3,784,738 shows (FIG. 11) use of spaced separate image tube cameras and headgear for receiving signals. The distance between the cameras is the average eye interpupillary distance of a human.

The text entitled *The World of 3-D* by Jac. G. Ferwerda published by Netherlands Society for Stereo Photography, 1982, also describes stereo photography using two cameras.

SUMMARY OF THE INVENTION

The present invention of a pilot navigational aid provides a great enhancement of the pilot's or observer's view of objects in the air space being approached by an aircraft by widely mounting cameras or other detectors of an illuminated object. Particularly the detectors are mounted at substantial wide locations on opposed wings of the aircraft. The viewer's base line for stereo viewing is greatly increased, for example, to a distance of 10 meters. At such displacement, depth perception of objects at a finite distance of from about 0.3 kilometers to 10 kilometers is such as to be clearly ascertained by the typical pilot or observer. In effect, the pilot views stereo images as if his eye interpupillary distance is 10 meters apart, as are the cameras or other illumination detectors.

Depth perception may be further increased by mounting the cameras a further distance apart, for example, out to wing tips themselves, which might be a spacing distance of 65 meters in certain types of modern high speed aircraft. Good depth perception is considered to arise in a human where $30 s \leq D \leq 1000$ where D is the distance of the object and s is the baseline separation. Thus, the human eyes with a 5.5–7.5 cm interpupillary distance have good stereo perception from about 100 cm to 100 meters. It has been reported that 99.8% of the adult white, male inhabitants of the United States of America have an interpupillary separation between 55 and 75 mm (5.5 to 7.5 cm). If the s baseline separation is increased to 20 meters, good stereo perception can be attained over actual finite distances D of about 0.6 km to about 20 km as long as the detectors are designed to pick up clear images and are properly focused. To accomplish the above depth perception enhancement separate right and left sensors are positioned on widely-spaced positions, respectively, on the right and left wings of the aircraft facing generally ahead. Each sensor, for example, a video camera, is aimed in such a way that they would converge upon objects at distances for which their baseline is suited, and the field covered by each of the two cameras would necessarily be the same, or substantially the same, in order to resolve the stereo image of the field. In another embodiment, an illuminating beam may be deployed from the aircraft and the spaced detectors may pick up the stereo signals reflected. The invention is generally described in terms of a video camera where light representing the scene being imaged impacts the camera receiving surface and the resulting signals transmitted by on-board transmission lines to a stereo viewing device in the pilot cabin or to a helmet-type device worn by the pilot or observer.

Use of the enhanced stereo system allows the pilot to better discern objects at a far distance by increasing depth perception allowing one to pick out the object better from its background. The pilot can therefore intuitively operate the aircraft controls or make decisions based on his imaging skills and better avoid or manipulate equipment based on the more accurate location of the object. The invention also enhances pilot ability to fy under VFR (Visual Flight Rules) and lessens dependency on IFR (Instrument Flight Rules).

A feature of the invention is to include sets of cameras spacedly positioned both inboard and outboard of the aircraft wings so that the user may use the set of inboard cameras during the takeoff at low speeds where most depth perception resolution is needed at closer distances of about 0.3 km, and use the outboard set of cameras during high speeds resulting in enhanced resolution out to about 20 km. Midrange enhancement can also be provided by a third set of cameras positioned between the first and second sets of cameras. It is also contemplated that one pair of cameras may be movable on a track one each wing so that a wide range of spacing over an infinite number of points can be utilized and that the pilot can "tune-in" to what is most comfortable for his vision and scanning requirements.

In a further embodiment the spaced cameras may be on different spaced aircraft, i.e., one camera on each aircraft with the aircraft flying generally parallel to each other, so that the stereo baseline is increasable to whatever separation there is between the aircraft. In the case of objects in far space, such as celestial objects, where everything looks to be in the same plane against the blackness of space, a very wide baseline between separated space vehicles, each having a detector and a communications link between the vehicles, would allow a measure of depth perception otherwise unobtainable.

BRIEF DESCRIPTION OF DRAWINGS

FIG. 1 is a schematic representation of an airborne viewing system in flight mode.

FIG. 2 is a diagrammatical view representing a depth perception baseline and distance to an object in air space.

DETAILED DESCRIPTION

Figure 3:
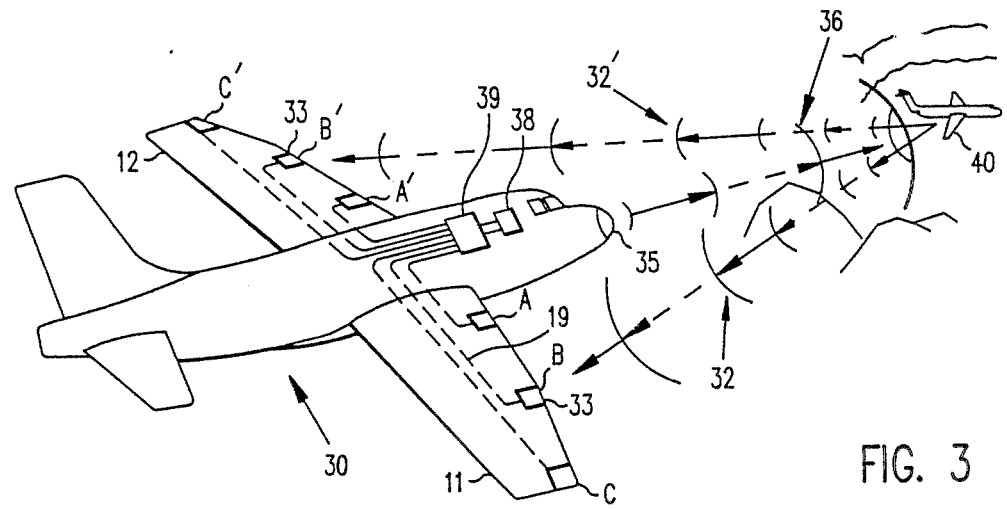
FIG. 3 is a schematic representation of an air vehicle having multiple wing-mounted sensors used for varying the depth perception baseline on the vehicle.

FIG. 1 shows an in-flight aircraft 10 having wings 11, 12, vertical stabilizer 16, horizontal stabilizer 17 and cockpit 18. Engines, rudder, tabs, elevators, ailerons, flaps, spoilers and landing gear are not shown. Normally the pilot or observer in the cockpit 18 while operating in visual mode can observe another object in space, such as a distance aircraft target 20 through his own eyes. As heretofore mentioned, the pilot depth perception is severely limited and good depth perception acuity basically covers a distance of about 100 cm to about 100 meters. This is due in large measure to the small 5–6 cm baseline provided by a person's interpupillary distance. Particularly when the target viewed is against a background of clouds 23, mountains 21, 22 or other terrain, the ability of a pilot to pick up the object is lessened when he has no depth perception of the object. The object "fades" into the background.

In order to increase that depth perception, the pilot depth perception baseline is increased by orders of magnitude by providing a navigational aid allowing the pilot to observe a stereoscopic "picture" of the object from signals displayed in the cockpit from widely spaced sensors mounted on the wings of the aircraft 10. "Navigational aid" as used herein means apparatus providing visual input data dictating the responses by a pilot of a vehicle resultant from visual observations during movement through three-dimensional space to direct the vehicle in a desired direction, to avoid hazards of terrain or to avoid other passive or active vehicles or their armament (air-to-air missiles, for example) moving in the same three-dimensional space. A first right sensor 13 is mounting on right wing 11 in a forward-facing position to scan forward of the aircraft while a second left sensor 14 is similarly mounted on left wing 12. Sensors shown may be high-resolution video cameras such as Model 4800 manufactured by Cohu Inc., San Diego, Calif. The scan angle from the aircraft forward vector of each camera must be exactly the same, cover substantially the same field of view, and ideally fill the 120° cone of vision that humans are normally accustomed to. Signals from the sensors are controlled from and received in a stereo viewer and displayed to the vision of the pilot. The viewer may be a cockpit-mounted display or be incorporated in a helmet viewing system (not shown) worn by the pilot. The depth perception baseline of the pilot is thus increased from 5.5–7.5 cm to 10 meters or more, dependent on the length of the wings and width of the aircraft fuselage and the mounted position(s) of the sensors. In an embodiment where the baseline distance S is 20 meters, the pilot's depth perception covers an object distance D of from about 0.6 km to 20 km. In an aircraft flying at 1200 km. hour or 20 km/minute the pilot can seen objects in good stereo with good depth perception out to one minute ahead of this flight path.

FIG. 2 illustrates sensors 13 and 14 being focused on object 20'. A first image 13' and a second image 14' are sensed by the face of sensors 13 and 14. Video signals representing the distant object 20' are then transmitted by electrical lines 19 to a stereo viewer 15' for observation by the pilot or other observer.

Another embodiment of the invention is seen in FIG. 3 in which each wing mounts three sensors A, B, C, A', B' and C' in spaced positions to provide a relatively small baseline in terms of about five meters between sensors A and A'; a medium baseline of about 10 meters between sensors B and B'; and a large baseline of about 20 meters between sensors C and C'. The multiple sensors may be video cameras as in FIG. 1 or may be sensors that respond to a returned signal from illumination of the target 40 by a radar beam 36 emenating from a radar wave emitter 35 mounted on the front of the aircraft fuselage. Radar return signals 32, 32' are picked up by a radar transponder or sensors 33, 33' (B, B'), for example, and are transmitted in turn by transmitting lines 19 to a radar signal stereo viewer 38 in cockpit 18 through control 39. Suitable selector switches (FIG. 4) are provided which allow the pilot to select which pairs of sensors are to operate. If desired, selection of sensor pairs may be automatic dependent on the detected speed of the aircraft or based on a predetermined search distance pattern.

Figure 4:
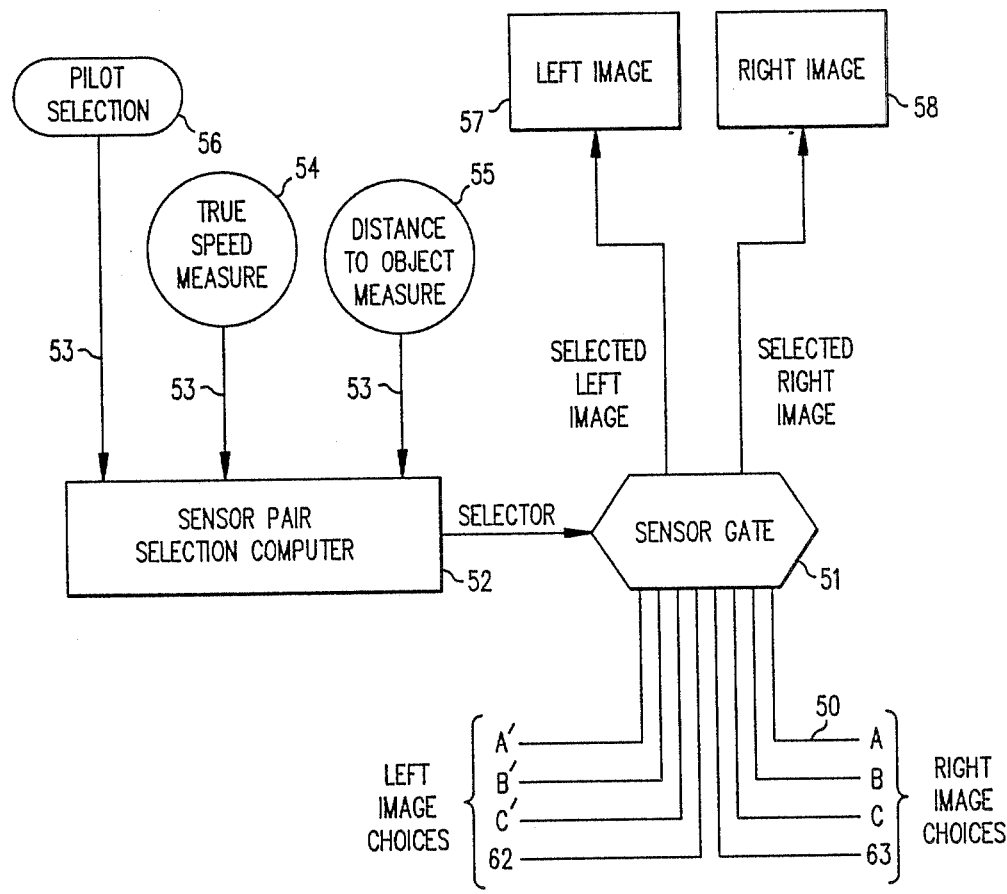
FIG. 4 is an electrical block diagram of an overall airbourne sensor system.
Figure 5:
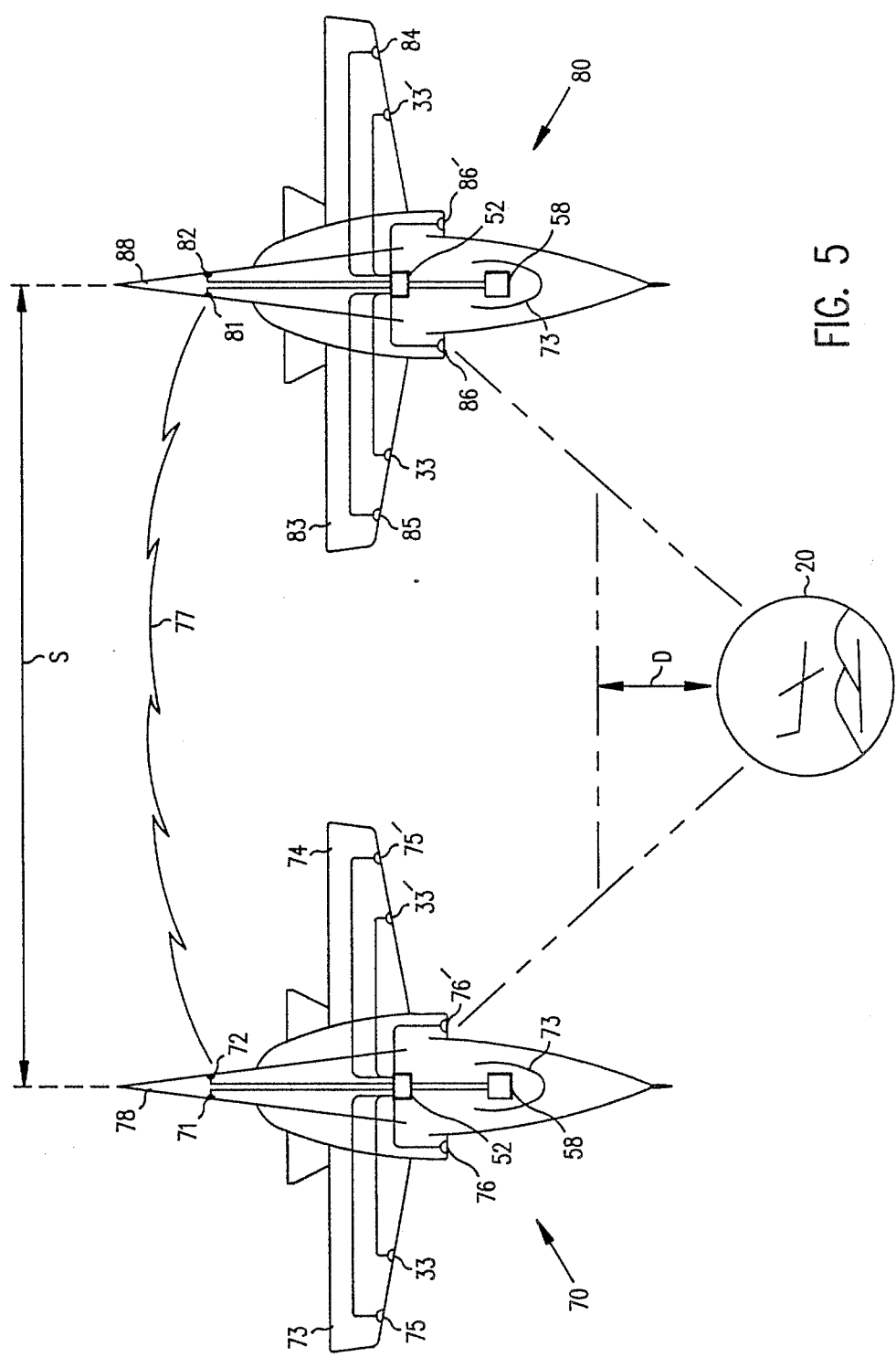
FIG. 5 is an embodiment of an airborne sensor system involving multiple vehicles.

FIG. 4 shows in more detail the electronics of the airborne system. Sensors A, B, C, A', B', and C' mounted on the aircraft wings transmit signals over transmission lines 50 in the vehicle to a selector gate 51. External sensors 62, 63 are typically located in the vertical stabilizer of the aircraft and function to receive antenna signals from a coordinate stereo sensor located on another aircraft (FIG. 5). A control subsystem comprises a sensor pair selection computer 52, a sensor pair gate 51, and control lines 53 from a true air speed indicator 54, a distance measuring device 55, such as a radio ranging or radar ranging unit, and a pilot sensor pair selector override 56. Based on time of RF or light pulse transmission and return, a distance computer incorporated in computer 52 comprising a time sense circuit computes the distance to the object 40 and selects a particular pair of sensors i.e. A, A'; B, B' OR C, C' for operation. The image from each selected sensor provides a left wing view 57 and a right wing view 58 of object 40 and these views are transmitted to stereo viewer 38, for stereoscopic viewing by the pilot or observer. Thus a pilot may select the inboard pairs A, A' during takeoff, the midrange pairs B, B' near airport locations and long range pairs C, C' to pick up objects in a wider expanse of air space. The control system provides automatic sensor pair selection. One image is selected from the right image choices and a second image is selected from the left image choices by means of one of the following: measured distance to object establishes requirement for sensor separation; measured true speed implies "look-ahead" distance criteria for sensor separation; and pilot override selection.

The sensors illustrated may be high-resolution digital video cameras, such as used in television production or infrared cameras, radar receivers or sonar or tuned light receivers. An object may be illuminated by high-intensity laser light, radar waves, sonar (sound) waves, or infrared or laser energy. Appropriate magnification of each sensor by optical or digital signal processing techniques signal improvement means may also be provided to allow a clear detailed view of objects at various distances D. A helmet-mounted stereo display may be employed by the pilot. Inside the helmet, each eye sees a separate liquid crystal display (LCD) panel which serves as a viewing screen. each screen receives slightly different imagery so that the point of view of each image is offset, facilitating the perception of depth. Wide field-of-view optics expand the visual field for each eye so that the user's field of view is filled with the contents of the LCD screen. When viewed together, the separate images fuse to generate a full field of view and three-dimensional view of the images presented by the sensors. Such a helmet is described in more detail in a paper presented at the Space Station Human Factors Research Review Dec. 3-6, 1985 at NASA Ames Research Center, Moffet Field, Calif., by Scott S. Fisher entitled "Virtual Interface Environment". The helmet device has also been displayed at the Consumer Electronics Show, Las Vegas in Jan. 1986 as reported by the San Jose Mercury News, Jan. 12, 1986, page 3A.

FIG. 5 illustrates another embodiment of the invention in which a still greater depth perception baseline S is provided by having left and right view sensors on separate spaced vehicles The spacing of the vehicles providing the baseline may be 100 meters apart to provide enhanced depth perception to about 1000 km. In space vehicles, the baseline may be hundreds or thousands of miles provided the sensors may be of sufficient light gathering ability to detect energy being reflected from the object. Vehicles 70 and 80 are shown flying in formation a distance S apart. One of the video cameras or sensors 85, 33, 86 from vehicle 80 picks up a left view of object 20 when properly focused at an aircraft-to-object distance D. Simultaneously a video camera or sensor 25', 33' or 76' provides a focused right hand view of object 20. These two views controlled by control 52 are combined into a stereo image on stereo viewer 73 in the cockpit 58 of both aircraft. A radio signal link 77 from the respective aircraft transmits or receives the respective left and right view to the other craft through left and right antennas 71, 72 and 81, 82 typically mounted on the aircraft tails Aircraft 70 has additional sensors 76, 33 and 75 on wing 73 and aircraft 80 has additional sensors 33', 84' and 86', all of which are inactive in the example recited above.

While the invention has been described in terms of aircraft it is contemplated that it may be utilized in viewing man-made or celestial objects from satellites or space shuttle vehicles in space or vehicles in other environments. It is also contemplated that the sensors may be movably mounted on a track along the wing so that full range of spacings can be provided between the sensor on the left wing and the sensor on the ring wing. In such event and in the modification seen in FIG. 3 the pilot may "tune-in" to the pair of sensors with the baseline spacing S which is most comfortable to his depth perception and most convenient for his depth requirement. Further, in the case of passenger aircraft it is contemplated that the stereo image may also be transmitted to a viewer screen(s) in the passenger cabin for passenger information and enjoyment.

In summary, the present invention provides for mounting sensors on an aircraft or between aircraft where the sensors are separate by a finite substantial spacing in terms of at least one meter of distance. Particularly a sensor spacing of from about five to about sixty-five meters in aircraft application provides a depth perception capability in the pilot/observer at distances of from about 0.15 km to 5 km at the lesser spacing and about 2 km to 65 km at the greater spacing, based on the depth perception effect being present for a pilot between 30S and 1000S where S is the camera/sensors baseline.

The above description of embodiments of this invention is intended to be illustrative and not limiting. Other embodiments of this invention will be obvious to those skilled in the art in view of the above disclosure.

I claim:

1. An airborne stereoscopic imaging system comprising:

a first aircraft having opposed first and second wings;
a first imaging sensor attached to one of said wings in a generally forward-facing field of view;
a second imaging sensor attached to the other of said wings in a generally forward-facing field of view; said sensors being spaced from each other along a predetermined baseline distance and each sensor being movable to scan and focus at an object positioned at a distance, generally in advance of an intended flight path of said aircraft;
a stereo viewer in said aircraft for receiving imaging signals from said sensors;
means connected between said sensors and said stereo viewer for transmitting imaging signals from said sensors to said stereo viewer, such that the depth perception of a human viewer in said aircraft, viewing a display on said stereo viewer representative of the imaging signals received by said stereo viewer, is enhanced; and
further including a second aircraft, said second aircraft containing a third imaging sensor and means for radio-link transmitting a signal representative of an image on said third sensor to said first aircraft wherein the baseline distance between one of said first and second sensors and said third sensor represents said predetermined baseline distance.

2. An airborne stereoscopic imaging system comprising:
an aircraft having opposed first and second wings;
a first imaging sensor attached to one of said wings in a generally forward-facing field of vision;
a second imaging sensor attached to the other of said wings in a generally forward-facing filed of view;
said sensors being spaced from each other along a predetermined baseline distance of from at least one meter to a distance whereat said sensors have sufficient imaging gathering ability to detect energy being reflected from a distant actual object, and each sensor being movable to scan and focus similarly at said actual object positioned at a distance, generally in advance of an intended flight path of said aircraft;
a stereo viewer in said aircraft for displaying actual object images received stereoscopically from said sensors; and
means connected between sensors and said stereo viewer for transmitting said actual object images from said sensors to said stereo viewer, such that the depth perception of a human viewer in said aircraft, viewing a display on said stereo viewer representative of the actual object images received by said stereo viewer, is enhanced; and
including multiple imaging sensors positioned on each wing and means in said aircraft for selecting pairs of said sensors, one from each wing, for operation and transmission of images to said stereo viewer.

3. The system of claim 2 including a speed indicator in said aircraft and means dependent on said vehicle speed for selecting a particular pair of said pairs of sensors.

4. The system of claim 2 in which said distance of said object is in a range of 30 S to 1000 S where S is said predetermined baseline distance and said predetermined baseline distance is from about five meters to about 65 meters.

* * * * *

UNITED STATES PATENT AND TRADEMARK OFFICE
CERTIFICATE OF CORRECTION

PATENT NO.   : 4,805,015
DATED        : February 14, 1989
INVENTOR(S)  : J. William Copeland It is certified that error appears in the above-identified patent and that said Letters Patent is hereby corrected as shown below:

Col. 2, line 54, "30 s" should read --30 S--.
Col. 2, line 54, after "1000" insert --S--.
Col. 2, line 61, "s" should read --S--.
Col. 3, line 25, "fy" should read --fly--.
Col. 3, line 39, "one" should read --on--.
Col. 5, line 61, "each" should read --Each--.
Col. 6, line 12, after "vehicles" insert --.--.
Col. 6, line 23, "25'" should read --75'--.

Signed and Sealed this

Thirtieth Day of May, 1989

Attest:

DONALD J. QUIGG

Attesting Officer

Commissioner of Patents and Trademarks